United States Patent Office 3,348,919
Patented Oct. 24, 1967

3,348,919
PROCESS FOR PRODUCING HYDROGEN FROM FINELY DIVIDED METALS AND WATER AT AMBIENT TEMPERATURES
Durland Karl Shumway, New Market, N.J., assignor to Colgate-Palmolive Company, New York, N.Y., a corporation of Delaware
No Drawing. Filed Jan. 17, 1964, Ser. No. 338,301
6 Claims. (Cl. 23—211)

ABSTRACT OF THE DISCLOSURE

Aluminum, zinc, iron and copper in finely divided form reacts with water at ambient temperatures to produce an appreciable evolution of hydrogen employing a catalytic amount of an alkali metal salt of a polyaminocarboxylic acid metal chelating agent dissolved in the water.

---

This invention relates to a method for the preparation of hydrogen. In one particular aspect, it relates to the preparation of hydrogen by the reaction of certain metals with water.

It is known that highly reactive metals, such as sodium and potassium, react readily with water. Most conventional metals will not react with or dissolve in water except under the influence of strong acids or bases. However, iron and magnesium react with water at elevated temperatures above the normal boiling point of water.

I have discovered that certain metals which are not ordinarily considered to react with water will react with water at room temperature to produce hydrogen when the water has dissolved in it a suitable catalyst.

It is an object of the present invention to provide a convenient method for the preparation of hydrogen by the reaction of certain readily available metals with liquid water at ambient or room temperature and at atmospheric pressure.

Accordingly, my invention is a process for the preparation of hydrogen which includes the step of reacting a finely divided metal selected from the group consisting of aluminum, zinc, iron and copper with water in the presence of a catalytic amount of an alkali metal salt of a polyaminocarboxylic acid metal chelating agent.

The metals that react with water to produce hydrogen according to the process of my invention are aluminum, zinc, iron and copper. The order of their reactivity is as listed and parallels their position in the electromotive force series. Since only a very poor or negligible amount of hydrogen is obtained when the metal is employed in the form of large chunks or solid pieces, it is essential that the reactant metal be finely divided for satisfactory hydrogen evolution. Metal filings are suitable but superior results are obtained when the metal is in the form of a powder. Efficient stirring, as expected, promotes the rate of hydrogen formation.

The solids precipitating from the hydrogen preparative reaction are made up primarily of inorganic metal oxides. This appears to confirm that the principal hydrogen-liberating reaction is between the reactant metal and water with the chelating agent acting as the catalyst for the reaction.

As a group, metal chelating agents are well known to those skilled in the art of chemistry. By the term "polyaminocarboxylic acid metal chelating agent" is meant a compound capable of coordinating or sequestering a metal and characterized by the presence of more than one aminocarboxylic acid group. The aminocarboxylic acid group $N—(CH_2)_2—COOH$ is as defined by Chaberek and Martell in the first chapter of their book, "Organic Sequestering Agents," published by John Wiley & Sons., Inc., New York (1959). Specific illustrations of such polyaminocarboxylic acid chelating agents are given by Smith in the fifth chapter under (c) of his book, "The Sequestration of Metals," published by the Macmillan Company, New York (1959).

Typical polyaminocarboxylic acid metal chelating agent catalysts suitable for use in the presence of my invention include ethylenediaminetetraacetic acid, N-(hydroxy ethyl)-ethylenediaminetriacetic acid and diethylene triaminepentaacetic acid. The presence of more than one aminocarboxylic acid group is necessary for the chelating agent to be operative as a catalyst. For example, triethanolamine and others of the poly hydroxyamine type, and even N,N-(dihydroxyethyl)-glycine, a monoaminocarboxylic acid sequestrant, give little if any hydrogen evolution when tested as catalysts for the reaction of iron with water.

The chelating agent catalyst is best employed in the form of its water-soluble alkali metal salt. Solutions containing from 1 to 25% of the catalyst by weight have been tested and the concentration of catalyst has not been found to be critical. The catalyst need only be present in catalytic amounts for an appreciable evolution of hydrogen to take place. Since the amount of catalyst employed will affect the rate of reaction between the metal and water, the concentration of catalyst is selected so as to give the desired degree of hydrogen evolution.

My process is most conveniently employed at ambient or room temperatures, the temperature of reaction not being critical to the process of my invention. As would be expected, the rate of hydrogen formation will be increased when warmer water is used and decreased when colder water is used. Since my process requires the presence of liquid water, it will be operative at temperatures above the freezing point of water and may even be employed at temperatures above the normal boiling point of water provided that the system is kept under sufficient pressure to maintain a liquid phase. However, such a pressure system would be more expensive and less convenient than one operating at atmospheric pressure.

My invention is further illustrated by the following series of examples:

*Example series 1*

(A) Thirty grams of tetrasodium ethylenediaminetetraacetate was added to 200 milliliters of distilled water in a flask connected to a gas collection bottle. Five grams of powdered iron were added to the flask and continuous stirring of the contents begun. After about one-half hour, gas evolution was proceeding at an increasing rate. The gas was collected by displacement of water from the gas collection bottle and identified by mass spectral analysis as being essentially pure hydrogen.

(B) Using the same apparatus as in A, further experiments were made in which the concentration of tetrasodium ethylenediaminetetraacetate was varied from 1 to 25% by weight and in which the pH was adjusted at various values from 7 to 12. Hydrogen gas was evolved as in A.

(C) Essentially the same results were obtained when trisodium N-(hydroxyethyl)-ethylenediaminetriacetate was substituted for tetrasodium ethylenediaminetetraacetate in A.

(D) Using an experimental procedure similar to that of A, no visible liberation of hydrogen occurred when an iron cotter pin was placed in a 20% aqueous tetrasodium enthylenediaminetetraacetate solution (10 grams of sequestrant in 40 grams of water).

*Example series 2*

A series of test tube experiments were set up to test the reaction of various metals with water in the presence of representative polyaminocarboxylic acid metal chelating agents. In each test, approximately one gram of the powdered metal was added to 20 milliliters of an approximately 5% by weight in water solution of pentasodium diethylenetriaminepentaacetate, trisodium N - (hydroxyethyl)-ethylenediaminetriacetate or tetrasodium ethylenediaminetetraacetate. With the less reactive systems, an induction period was observed prior to actual hydrogen evolution.

(A) The weakest hydrogen evolution was obtained using iron powder with the pentaacetate and with the triacetate; the resultant solution was light yellow or amber. Stronger hydrogen evolution was obtained with the tetraacetate resulting in the formation of an orange-brown solution.

(B) Copper powder gave a moderate liberation of hydrogen with the pentaacetate and with the triacetate and a stronger liberation with the tetraacetate. The solutions went from light to dark blue as the reaction progressed.

(C) Zinc powder reacted quickly with tri-, tetra- and pentaacetates to give a strong evolution of hydrogen. The solutions remained colorless.

(D) Stainless steel (type 304) powder reacted with the pentaacetate and more slowly with the triacetate and with the tetraacetate to give a good evolution of hydrogen. The pentaacetate reaction mixture was first blue and then turned blue-green. The triacetate and the tetraacetate reaction mixtures were green but the former was much darker than the latter.

The above-offered discussion and examples are intended to illustrate my process and my invention is not limited to the specific procedures described.

I claim:

1. In a method for producing and recovering hydrogen by the interaction of a finely divided metal selected from the group consisting of aluminum, zinc, iron and copper with liquid water, the improvement which comprises carrying out the said reaction with a catalytic amount of water-soluble alkali metal salt of a polyaminocarboxylic acid metal chelating agent dissolved in said water.

2. A process according to claim 1, wherein the amount of metal chelating agent ranges from 1 to 25% by weight.

3. A process according to claim 1, wherein the reaction is carried out at ambient temperatures.

4. A process according to claim 1 wherein the polyaminocarboxylic acid metal chelating agent is tetrasodium ethylenediaminetetraacetate.

5. A process according to claim 1 wherein the polyaminocarboxylic acid metal chelating agent is trisodium N-(hydroxyethyl)-ethylenediaminetriacetate.

6. A process according to claim 1 wherein the polyaminocarboxylic acid metal chelating agent is pentasodium diethylenetriaminepentaacetate.

References Cited

UNITED STATES PATENTS

| | | | |
|---|---|---|---|
| 98,442 | 12/1869 | Steiner | 23—211 X |
| 1,059,818 | 4/1913 | Bergius | 23—211 |

OTHER REFERENCES

Robert L. Smith book "The Sequestration of Metals," 1959 ed., pp. 85, 86, The Macmillan Co., New York.

OSCAR R. VERTIZ, *Primary Examiner.*

EDWARD STERN, *Examiner.*